(12) United States Patent
James et al.

(10) Patent No.: US 11,216,874 B2
(45) Date of Patent: *Jan. 4, 2022

(54) METHOD AND SYSTEM FOR AGGREGATING FOREIGN EXCHANGE MEASURES

(71) Applicant: JPMorgan Chase Bank, N.A., NY, NY (US)

(72) Inventors: Richard C. James, London (GB); Robert Hare, Leigh on Sea (GB); Sam Hampton, London (GB)

(73) Assignee: JPMorgan Chase Bank, N.A., New York, NY (US)

( * ) Notice: Subject to any disclaimer, the term of this patent is extended or adjusted under 35 U.S.C. 154(b) by 500 days.

This patent is subject to a terminal disclaimer.

(21) Appl. No.: 15/454,238

(22) Filed: Mar. 9, 2017

(65) Prior Publication Data
US 2018/0260893 A1   Sep. 13, 2018

(51) Int. Cl.
*G06Q 40/04*   (2012.01)

(52) U.S. Cl.
CPC .................. *G06Q 40/04* (2013.01)

(58) Field of Classification Search
CPC ........ G06Q 40/00; G06Q 40/02; G06Q 40/04; G06Q 40/06; G06Q 10/04; G06Q 20/38; G06F 3/048
See application file for complete search history.

(56) References Cited

U.S. PATENT DOCUMENTS

| | | | |
|---|---|---|---|
| 6,912,511 B1 * | 6/2005 | Eliezer | G06Q 40/04 705/37 |
| 7,496,531 B1 | 2/2009 | Gastineau | |

(Continued)

FOREIGN PATENT DOCUMENTS

WO   2018/165094   9/2018

OTHER PUBLICATIONS

Hendrik Bessembinder, Marios Panayides, Kumar Venkataraman, "Hidden liquidity: An analysis of order exposure strategies in electronic stock markets", Journal of Financial Economics, vol. 94, Issue 3, Dec. 2009, pp. 361-383 (Year: 2009).*

(Continued)

*Primary Examiner* — Christopher Bridges
*Assistant Examiner* — Tony P Kanaan
(74) *Attorney, Agent, or Firm* — Hunton Andrews Kurth LLP

(57) ABSTRACT

According to an embodiment of the present invention, an automated computer implemented system aggregates foreign exchange data and graphically represents a change in spread. The system comprises a computer processor coupled to a storage mechanism, an aggregator server, an orders server and an interactive user interface. The computer processor is programmed to: aggregate data from a plurality of market data sources representing a plurality of different underlying markets; generate an amount view, based on the aggregated data, that illustrates smart liquidity with respect to a moving average based on a predetermined time period plus two standard deviations; and provide, via the interactive user interface, an interactive amount view with a slope that represents a change in spread between a bid and an offer.

18 Claims, 13 Drawing Sheets

(56) References Cited

U.S. PATENT DOCUMENTS

| | | | | |
|---|---|---|---|---|
| 7,542,937 B1* | 6/2009 | Cohen | G06Q 40/04 | 705/37 |
| 7,555,456 B2* | 6/2009 | Rosenthal | G06Q 40/025 | 705/37 |
| 7,912,775 B1* | 3/2011 | Brill | G06Q 40/00 | 705/36 R |
| 8,346,647 B1* | 1/2013 | Phelps | G06Q 40/06 | 705/36 R |
| 8,521,637 B2 | 8/2013 | Brandes | | |
| 9,135,661 B2 | 9/2015 | Chacko | | |
| 10,311,515 B2* | 6/2019 | Katsuyama | G06Q 40/04 | |
| 10,489,855 B1* | 11/2019 | Mecane | G06Q 40/04 | |
| 10,614,520 B2* | 4/2020 | Adcock | G06Q 40/04 | |
| 2002/0032579 A1* | 3/2002 | Harpale | G06Q 30/06 | 705/26.2 |
| 2003/0177126 A1 | 9/2003 | Weingard | | |
| 2003/0200167 A1* | 10/2003 | Kemp, II | G06Q 40/00 | 705/37 |
| 2004/0019549 A1* | 1/2004 | Gulbrandsen | G06Q 40/06 | 705/36 R |
| 2004/0078317 A1* | 4/2004 | Allen | G06Q 40/04 | 705/37 |
| 2004/0100467 A1* | 5/2004 | Heaton | G06T 11/206 | 345/440 |
| 2004/0193524 A1* | 9/2004 | Almeida | G06Q 40/06 | 705/36 R |
| 2005/0075966 A1* | 4/2005 | Duka | G06Q 40/04 | 705/37 |
| 2005/0075967 A1* | 4/2005 | Sandhu | G06Q 30/02 | 705/37 |
| 2005/0154769 A1 | 7/2005 | Eckart | | |
| 2005/0273421 A1* | 12/2005 | Rosenthal | G06Q 40/025 | 705/37 |
| 2006/0080217 A1* | 4/2006 | Blackall | G06Q 40/04 | 705/37 |
| 2006/0136318 A1* | 6/2006 | Rafieyan | G06Q 40/04 | 705/37 |
| 2006/0235786 A1* | 10/2006 | DiSalvo | G06Q 40/04 | 705/37 |
| 2006/0253379 A1* | 11/2006 | Adcock | G06Q 40/04 | 705/37 |
| 2006/0253382 A1* | 11/2006 | Adcock | G06Q 40/04 | 705/37 |
| 2006/0271469 A1* | 11/2006 | Rust | G06Q 40/025 | 705/37 |
| 2007/0005485 A1* | 1/2007 | Tumen | G06Q 40/10 | 705/37 |
| 2007/0208654 A1 | 9/2007 | Stearns | | |
| 2007/0240053 A1* | 10/2007 | Lutnick | G06Q 40/04 | 715/700 |
| 2008/0183639 A1* | 7/2008 | DiSalvo | G06Q 40/02 | 705/36 R |
| 2009/0043664 A1* | 2/2009 | Lutnick | G06Q 30/0611 | 705/80 |
| 2009/0157563 A1 | 6/2009 | Serbin | | |
| 2009/0276367 A1* | 11/2009 | Rosenthal | G06Q 40/04 | 705/36 R |
| 2009/0276373 A1* | 11/2009 | Rosenthal | G06Q 40/025 | 705/36 R |
| 2009/0287611 A1* | 11/2009 | Jeng | G06Q 40/06 | 705/36 R |
| 2010/0057618 A1* | 3/2010 | Spicer | G06F 3/04815 | 705/64 |
| 2010/0094744 A1 | 4/2010 | Van Slyke | | |
| 2010/0145843 A1 | 6/2010 | Janowski | | |
| 2010/0174666 A1* | 7/2010 | Brandes | G06Q 40/06 | 705/36 R |
| 2010/0312718 A1* | 12/2010 | Rosenthal | G06Q 40/06 | 705/36 R |
| 2011/0016037 A1* | 1/2011 | Tumen | G06Q 40/04 | 705/37 |
| 2011/0035342 A1* | 2/2011 | Koblas | G06Q 40/00 | 705/500 |
| 2011/0106684 A1* | 5/2011 | Fuller | G06Q 40/00 | 705/37 |
| 2011/0137822 A1* | 6/2011 | Chapman | G06T 11/206 | 705/36 R |
| 2011/0246390 A1* | 10/2011 | Yang | G06Q 40/06 | 705/36 R |
| 2012/0158568 A1* | 6/2012 | Ford | G06Q 40/00 | 705/37 |
| 2012/0215717 A1* | 8/2012 | Arnott | G06Q 40/06 | 705/36 R |
| 2013/0041707 A1 | 2/2013 | Bose | | |
| 2013/0080353 A1* | 3/2013 | Kovarsky | G06Q 40/06 | 705/36 R |
| 2013/0085916 A1 | 4/2013 | Abbe | | |
| 2013/0110695 A1* | 5/2013 | Domowitz | G06Q 40/04 | 705/37 |
| 2013/0204765 A1* | 8/2013 | Koh | G06Q 20/381 | 705/37 |
| 2014/0006244 A1 | 1/2014 | Crowley | | |
| 2014/0136386 A1* | 5/2014 | Petruzzi | G06Q 40/04 | 705/37 |
| 2014/0279365 A1* | 9/2014 | Srivastava | G06Q 40/04 | 705/37 |
| 2014/0279367 A1* | 9/2014 | Srivastava | G06Q 40/04 | 705/37 |
| 2014/0330694 A1 | 11/2014 | Barker | | |
| 2015/0106251 A1* | 4/2015 | Famstrom | G06Q 40/04 | 705/37 |
| 2015/0120526 A1* | 4/2015 | Peterffy | G06Q 40/04 | 705/37 |
| 2015/0127520 A1* | 5/2015 | Famstrom | G06Q 40/04 | 705/37 |
| 2015/0187000 A1 | 7/2015 | Singers | | |
| 2015/0332396 A1* | 11/2015 | Khuntia | G06Q 40/04 | 705/37 |
| 2015/0332403 A1* | 11/2015 | Baysal | G06Q 40/04 | 705/36 R |
| 2015/0348195 A1 | 12/2015 | Weber | | |
| 2016/0092984 A1* | 3/2016 | Shontz | G06Q 40/04 | 705/37 |
| 2016/0203557 A1* | 7/2016 | Pabrai | G06Q 40/06 | 705/37 |
| 2016/0247226 A1 | 8/2016 | Robert | | |
| 2016/0300302 A1* | 10/2016 | Singer | G06Q 40/04 | |
| 2016/0335720 A1* | 11/2016 | Gershon | G06Q 40/06 | |
| 2016/0350855 A1* | 12/2016 | Lerner | G06Q 40/04 | |
| 2016/0358264 A1 | 12/2016 | Brightman | | |
| 2017/0004563 A1* | 1/2017 | Noviello | G06Q 30/0633 | |
| 2017/0011463 A1* | 1/2017 | Pizzi | G06Q 40/06 | |
| 2017/0103462 A1* | 4/2017 | Peck-Walden | G06Q 40/04 | |
| 2017/0109822 A1* | 4/2017 | Borkovec | G06Q 40/04 | |
| 2017/0132703 A1* | 5/2017 | Oomman | G06Q 40/04 | |
| 2018/0068387 A1* | 3/2018 | Weisz | G06Q 40/04 | |
| 2018/0108088 A1* | 4/2018 | Shamis | G06Q 40/04 | |
| 2018/0260894 A1* | 9/2018 | James | G06Q 40/04 | |
| 2018/0260895 A1* | 9/2018 | James | G06Q 40/04 | |
| 2020/0126159 A1* | 4/2020 | Pechenik | G06Q 40/025 | |
| 2020/0364789 A1* | 11/2020 | Ram | G06Q 40/04 | |

OTHER PUBLICATIONS

U.S. Appl. No. 15/454,303, filed Mar. 2017, James, Richard.
U.S. Appl. No. 15/454,386, filed Mar. 2017, James, Richard.
Index, (Jan. 26, 2017), Investopedia, https://web.archive.org/web/20170126054849/https://www.investopedia.com/terms/i/index.asp (Year: 2017).
Volume Weighted Average Price—VWAP, (Feb. 27, 2017), Investopedia, https://web.archive.org/web/20170227162441/https://www.investopedia.com/terms/v/vwap.asp (Year: 2017).

(56) References Cited

OTHER PUBLICATIONS

"Bet Angel, Ladder/ Depth of Market Interface,(https://web.archive.org/web/20160330054542/https://www.betangel.com/user-guide/ladder interface.html), Mar. 30, 2016" (Year: 2016).

* cited by examiner

Figure 13

| | ISSUER | COUP | MATUR. | NOTIONAL | | | | | DVOI | Tips | BID | ASK |
|---|---|---|---|---|---|---|---|---|---|---|---|---|
| | | | | 0-3 | 3-5 | 5-7 | 7-30 | Bills | | Strips | | |
| △ | UST | 0.750 | W418 | | | | 150m | 1009 | ☐ | 100-500++ | 100-500++ |
| △ | UST | 0.876 | 419 | | | | 150m | 1009 | ● | 99-500 | 99-50+ |
| △ | UST | 1.375 | W421 | | | | 150m | 1009 | ☐ | 99-500 | 99-50+ |
| △ | UST | 1.500 | 323 | | | | 150m | 1009 | | 99-500 | 99-50+ |
| △ | UST | 1.625 | 226 | | | | 150m | 1009 | ● | 99-500 | 99-50+ |
| △ | UST | 1.625 | 226 | | | | 150m | 1009 | ☐ | 99-500 | 99-50+ |
| △ | USTB | | 05/12 | | | | 150m | 500,001 | | 150-0125 | 150-0125 |
| △ | USTB | | 05/26 | | | | 150m | 999,999 | | 1-0125 | 1-0125 |
| △ | USTW1B | | 08/14 | | | | 150m | 1,001 | | - | - |
| △ | UST | 0.375 | 416 | | | | 150m | 1,004 | | 99-500 | 99-50+ |
| △ | UST | 4.625 | N16 | | | | 150m | 1,012 | | 99-500 | 99-50+ |
| △ | USTTI | 0.125 | 419 | | | | 150m | 1,009 | | - | - |

Rates Trades (2)

METHOD AND SYSTEM FOR AGGREGATING FOREIGN EXCHANGE MEASURES

CROSS REFERENCE TO RELATED APPLICATIONS

This application is related to U.S. patent application Ser. No. 15/454,303, filed Mar. 9, 2017, and U.S. patent application Ser. No. 15/454,386, filed Mar. 9, 2017, the contents of which are incorporated herein by reference in their entirety.

FIELD OF THE INVENTION

The present invention relates generally to foreign exchange aggregation and more specifically to an interactive user interface that provides liquidity details including change in spread.

BACKGROUND OF THE INVENTION

A foreign exchange aggregator or FX Aggregator is a class of systems used in a foreign exchange market to aggregate the liquidity from several liquidity providers. Aggregators usually allow FX traders to compare price from different liquidity venues such as banks-global market makers or Electronic Communication Networks (ECNs) and to have a consolidated view of the market. Aggregators also allow traders to trade with many participants using a trading terminal. Some systems support order sweeping. This involves splitting an order into the chunks which then are sent to the respective counterparties based on the price, time and other attributes of the quotes. Other systems route an entire order to a single liquidity provider, who may be selected by an order routing algorithm embedded into an aggregator.

The foreign exchange market represents a global decentralized market for the trading of currencies. This may include various aspects of buying, selling and exchanging currencies at current or determined prices. The foreign exchange market does not determine the relative values of different currencies, but sets the current market price of the value of one currency as demanded against another.

In general, market liquidity is a market's ability to purchase or sell an asset without causing drastic change in the asset's price. In other words, an asset's market liquidity describes the asset's ability to sell quickly, without having to significantly reduce its price. Liquidity also represents the speed of the sale and the price it can be sold for. In the case of shares of stock, liquidity represents how easily the stock can be converted to cash.

Market depth is an electronic list of buy and sell orders, organized by price level and updated to reflect real-time market activity. This information may be useful to traders because it shows where the price is now and also where it is likely to be in the near future.

Different markets have different value propositions. For example, FX is a volatile and fragmented but can be a profitable market. An important element is the ability to access liquidity for clients.

Current approaches fail provide an accurate and comprehensive view of liquidity in FX markets. These and other drawbacks exist.

SUMMARY OF THE INVENTION

Accordingly, one aspect of the invention is to address one or more of the drawbacks set forth above. According to an embodiment of the present invention, an automated computer implemented system aggregates foreign exchange data and graphically represents a change in spread. The system comprises: a storage mechanism that stores user profile data and foreign exchange market data; an aggregator server that receives market data from a plurality of sources and aggregates market prices; an orders server that processes one or more orders based on the aggregated market data; an interactive user interface that receives one or more user inputs; and a computer processor. The computer processor is coupled to the storage mechanism, the aggregator server, the orders server and the interactive user interface, and programmed to: aggregate data from a plurality of market data sources representing a plurality of different underlying markets; generate an amount view, based on the aggregated data, that illustrates smart liquidity with respect to a moving average based on a predetermined time period plus two standard deviations; and provide, via the interactive user interface, an interactive amount view with a slope that represents a change in spread between a bid and an offer.

According to another embodiment of the present invention, an automated computer implemented method aggregates foreign exchange data and graphically represents a change in spread. The method comprises the steps of: aggregating, via an aggregator server, data from a plurality of market data sources representing a plurality of different underlying markets; generating, via a programmed computer processor, an amount view, based on the aggregated data, that illustrates smart liquidity with respect to a moving average based on a predetermined time period plus two standard deviations; an providing, via an interactive user interface, an interactive amount view with a slope that represents a change in spread between a bid and an offer.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 13 is an exemplary screenshot that illustrates a benchmark comparison, according to an embodiment of the present invention.

DESCRIPTION OF EMBODIMENTS OF THE INVENTION

Figure 1:
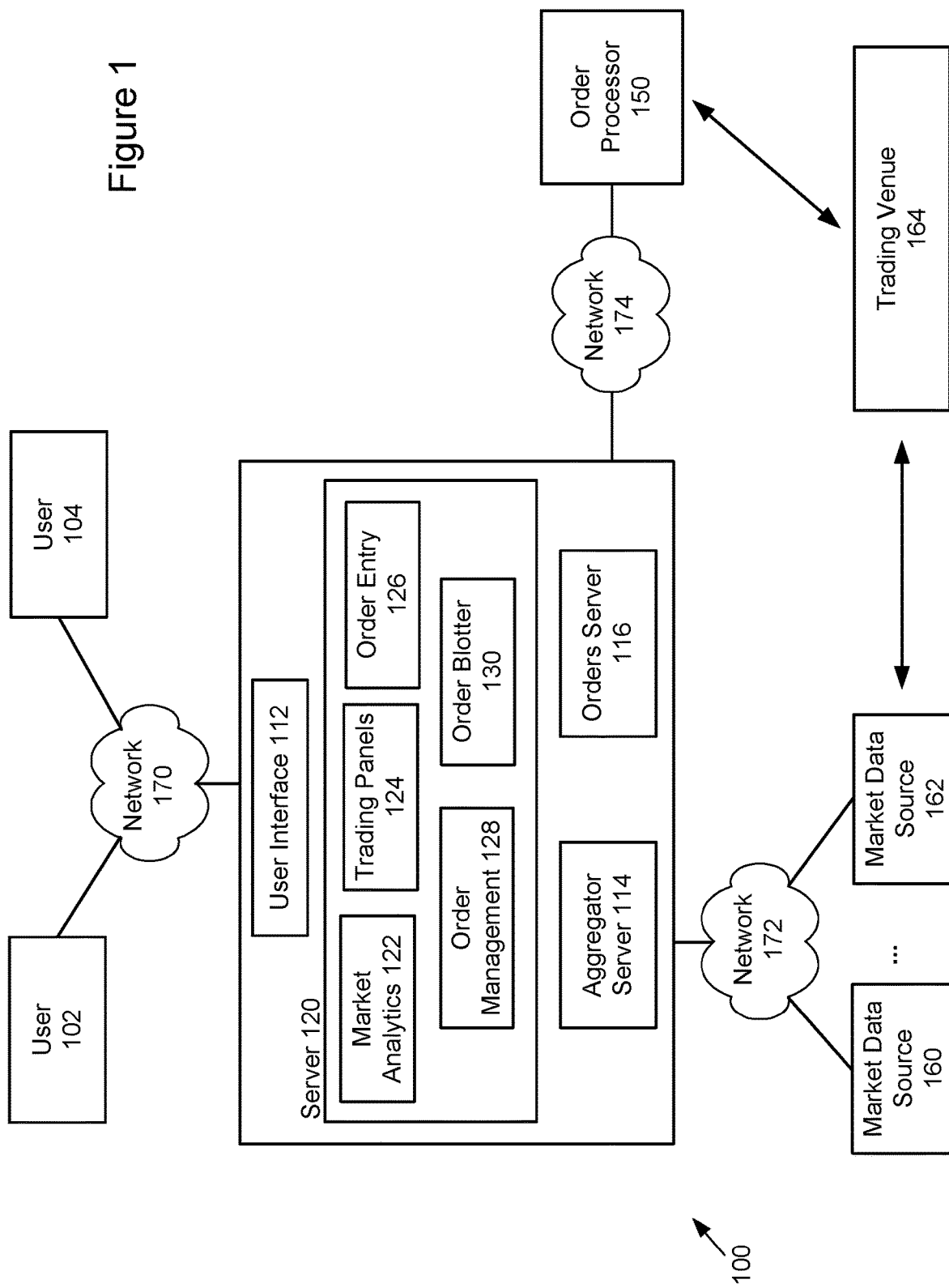
FIG. 1 is an exemplary system diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to aggregating price information from across market venues to provide an accurate view of market depth to users. An embodiment of the present invention is directed to flexibly amalgamating different combinations of liquidity venues into distinct "rooms" enabling users to view slices through the market. The system of an embodiment of the present invention further provides optimal execution for orders, across the totality of the marketplace as well as via defined venues/liquidity rooms where a subset is indicated. According to an embodiment of the present invention, the system continuously analyzes and exposes the execution profile of orders across different liquidity venues and rooms and further provides genuine liquidity depth within each venue and/or room. An embodiment of the present invention is directed to offering liquidity from selected and approved venues/segments to clients to provide improved liquidity and pricing as well as increasing flow and enhancing internalization opportunities. The system may be further tailored to specific client needs (e.g., fill-ratio optimization, market-impact avoidance, etc.).

An embodiment of the present invention is directed to providing transparency, fill certainty, and custom execution to various clients. With regards to transparency, the system may provide users with pre and post trade clarity on the market and details as to how a trade was filled. Where applicable, the system further allows the user to track progress against user defined targets (e.g., optimal or best execution mandate, etc.) and facilitates delivery of results (e.g., API, EOD/EOM reports, etc.). With regards to fill certainty, the system of an embodiment of the present invention supports the ability of a user to execute on a "what you see, is what you get" basis. With regards to custom execution, the system allows the user to define strategic input parameters and further create a customized algorithmic execution. This may be against dynamic or fixed inputs. The system further supports the ability to monitor performance against user defined and/or other targets.

An embodiment of the present invention is directed to an interactive interface that provides detailed and customized liquidity information to users. For example, the interactive interface may provide Market Information Analytics, Trading Panels, Order Entry, Order Management as well as other functionality.

For example, Market Information Analytics may include an Initial Liquidity Mix view which provides venue/segment mix for selected currency pair (ccypair) and volume point as well as Paid/Given Monitor across venues in liquidity mix. Currency pair represents the quotation and pricing structure of the currencies traded in the foreign exchange market where the value of a currency is a rate and is determined by its comparison to another currency. The first listed currency may represent the base currency while the second currency represents the quote currency. The market information analytics may also include Initial Historical analytics/MIS (Management Information System), including IoC (Immediate or Cancel) order reliability/fill statistics.

Trading Panels may display aggregated market prices (e.g., Top of the Book ("ToB"), Depth of Market ("DoM"), Volume Weighted Average Price ("VWAP"), etc.). Trading Panels may also enable users to switch between a franchise-only and aggregated market prices in same space. The system may provide flexible displays of VWAP/Depth/Orders in tools adjacent to core ticket (wings/feet) including fully definable pillars (e.g., fixed distance, whole/fractional pips, custom, etc.). Trade Panels may further provide calculation and display of smart (reliable) liquidity portion of raw market.

The system may provide Order Entry functionality via Order Tickets triggered from core ticket/wing areas, including Algo order placement as per existing AlgoX logic as well as IoC Order placement, across optimized architectures. Algorithmic trading represents a process of using automated pre-programmed trading instructions accounting for a variety of variables such as time, price and volume to send smaller slices out to the market over time. AlgoX represents a suite of order execution strategies that uses a smart order router to aggregate multiple liquidity sources.

AlgoX allows clients to execute larger orders than the standard order functionality because it can algorithmically slice them into smaller orders and execute them in a variety of ways. Orders may be internalized with the broker's existing liquidity and interests, traded against its support pricing or routed out to external liquidity sources. In addition, post-trade execution analysis is available for every order. Order Entry may also provide field interaction defaults for faster order placement.

The system of an embodiment of the present invention may provide Order Management, which may include an Order viewer that shows fills and completed orders and amends functionality (e.g., quick amend in-flight). Order Management functionality may also include an Order blotter (individual and group); alerts, notifications, etc.

Other features may include flexibility and functionality for liquidity display. This may involve a numerical and graphical representation of VWAP/Market Depth as well as multiple ticket analytic views (e.g., VWAP; Depth; Paid/Given; Orders, etc.) aligned beside or beneath core ticket. Other features may include a Display of "smart" liquidity vs "raw market" amounts. This may involve using Algo intelligence and historical metrics to calculate and display the reliable executable liquidity fraction of the raw market. Also, metrics may be available at an interactive interface (e.g., GUI, etc.) to display and thus drive up the hit ratios of immediate order types against this smart liquidity amount.

An embodiment of the present invention is directed to increased control over liquidity mix. For example, the system may provide IoC Order placement across selected Liquidity Room mix of venues; further order types routed through new architecture; MIS Execution Heuristics (which may represent MIS statistics which are heuristically gathered from real execution profiles and rooms to show the optimal execution strategy) built up for existing orders/rooms; keypad integration for navigation and order entry; keypad/keyboard interaction and templates for faster placement and interaction; and encompass requirements elicited from users and enhancements.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

FIG. 1 is an exemplary system diagram, according to an embodiment of the present invention. System 100 illustrates an exemplary implementation of an aggregator system of an embodiment of the present invention. Users 102, 104 may access the system via a network communication, as represented by 170. User Interface 112 provides an interface for the users to interact with Server 120, Aggregator Server 114 and Orders Server 116. Server 120 may provide various processing and functionality, as represented by Market Analytics 122, Trading Panels 124, Order Entry 126, Order Management 128 and Order Blotter 130. These modules are exemplary and illustrative, User Interface may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Aggregator Server 114 may receive market data from various sources, represented by Market Data Source 160, 162 via a network communication, represented by Network 172. Orders Server 116 may receive and implement orders from User Interface 112 to Order Processor 150, via a network communication, represented by Network 174. Order Processor 150 and various Market Source participants may perform trades and other actions through Trading Venue 164.

As shown in FIG. 1, Server 120 may include Market Analytics 122, Trading Panels 124, Order Entry 126, Order Management 128 and Order Blotter 130. For a selected currency pair or multiple pairs, Market Analytics 122 provides real-time summary of metrics, including Hi/Lo/Last. For example, Hi/Lo may be configurable to show either both Paid/Given or just lowest given/highest paid. "Last" may provide both Paid and Given by default. Market Analytics 122 provides last "x" number of ticks, with direction. According to an example of 100 ticks, the GUI may display nothing until the first tick. In this example, the buffer may continue to fill up until the $100^{th}$ tick, then on the $101^{st}$ tick, the GUI will drop the 1st tick and on the $102^{nd}$, the GUI will drop the $2^{nd}$ tick, etc.

Market Analytics 122 provides the ability to scroll back through a definable amount of last ticks, which may be definable by time, number of ticks and/or other measurement. Each tick may be associated with an amount, timestamp, source listed and whether Paid or Given. Also, Summary and Tick list may be independently controlled so that a user may view one, without the other, or both. Market Analytics 122 may also define a minimum size. For example, the small amount ticks may be filtered out and not considered a part of a Hi/Lo calculation.

From Trading Panel (wings/feet), or from standalone analytics panel, the system of an embodiment of the present invention may display venues, segments and/or types currently included in the aggregation mix and the proportion of each. For example, the system may switch between views: by venue; by segment; and/or by smart/raw liquidity (e.g., reliable versus unreliable). Users may view across entire liquidity ladder or by reference to volume point or range; view across both Bid and Ask sides of order book or one side only and also view graphical and numerical representations of various combinations.

Trading Panels 124 may provide "Top of Book" ("ToB") price and liquidity available at that price; display and customize a VWAP ladder view and display and customize a depth of market (e.g., liquidity by price band) view. For example, users may view and change default currency pair settings for various pairs, per individual pair and/or other combination. According to an embodiment of the present invention, Top of Book liquidity may represent a summation of all active liquidity venues' available liquidity at a best bid and a best offer level.

An embodiment of the present invention is directed to displaying and customizing a VWAP ladder view. The system may define volume bands (e.g., custom or stepped) and display VWAP price available at each volume band. A ladder of prices may be built with cumulative volume for venues at each price level.

With Order Entry 126, users may perform various order entry actions, including call-up Order tickets, large and with key information clearly displayed, call order ticket by clicking requisite area of trading panel (contextually linked to area selected); change amount and parameters with minimal keystrokes once order ticket is returned; choose between different order types from a user-specific list; allow definition of allowable slippage for IoC order type; and provide visibility from order entry ticket exactly what each parameter implies for each order type.

With Order Management 128, users may view an indication of current active orders on the respective Trading Panel. Users may view details of fills to date for partially-filled orders. Also, users may view slippage and residual amount of remaining unfilled order stubs. Users may fill remaining order stub on demand, at market or limit. In addition, users may perform quick amends, including: modify orders inflight using up/down arrows; cancel and bring up new order to amend as one action; and edit the rate on an active order quickly by overtype (e.g., pip+fractional highlight). Users may also cancel one, several or all active orders simply and easily from active view. The system may also provide a highly visible "Panic" button to cancel/suspend all orders. Users may also receive tailored sound/visual alerts for chosen situations (e.g., leg fill/miss, order done/partial fill/miss, trigger level, pre-cancellation warnings, etc.).

With Order Blotter 130, an embodiment of the present invention may provide details of completed and partially filled orders in real-time (e.g., total amounts and each individual fill, etc.); select different default blotter views: Current, Tabbed-Daily, Historical; see Average rate and position for any trade or multiple selected trades; retrieve full lifecycle details of any Order from blotter (e.g., full lifecycle including placed-and-missed legs as well as fills); sort and filter blotter (and active view) by any desired data field; and provide a Read-Only 'Group' view of orders placed by colleagues and associated fills.

An embodiment of the present invention is directed to various interactive user interfaces that provide detailed aggregated price information. For example, the user interface may provide aggregated prices, depth views, amount views, etc. The user interface may also enable user actions, such as monitor market activity and initiate order placement and control.

An embodiment of the present invention is directed to calculating and displaying aggregated prices where a user may switch between a single bank price and aggregated price. Prices for an aggregated stream and a single-bank stream may be shown in adjacent positions and switched or further customized by a user. For example, the interactive user interface may provide direct comparison to ascertain the most favorable execution channel. Aggregated prices may be set to encompass fees within the displayed price. This may be available for permissioned users.

An embodiment of the present invention may be directed to various views for the aggregate data, which may include Depth Views, Amount Views, etc.

Figure 2:
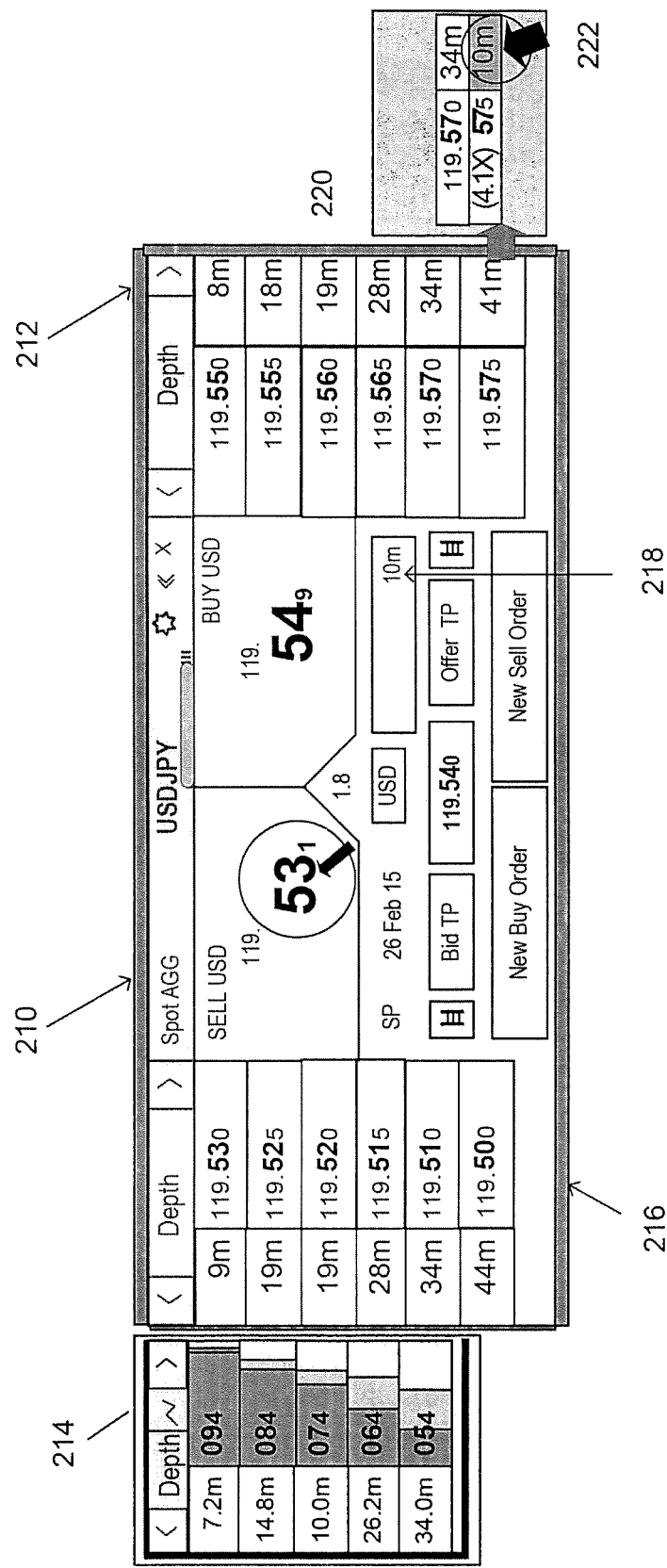
FIG. 2 illustrates an exemplary depth view summary, according to an embodiment of the present invention.

FIG. 2 illustrates an exemplary depth view summary, according to an embodiment of the present invention. Depth View enables optimized price execution as well as optimized fill certainty. Optimized price execution provides an immediate order placement at a best or optimal VWAP price. For example, a user may execute in a main ticket area, as shown at 210. Optimize fill certainty provides an immediate order placement within a defined limit. For example, a user may execute on a depth rung, as shown at 212. The interactive user interface also provides a toggle graphical mode where a user may toggle between an graphical market depth visualization, as illustrated at 214. The interactive user interface also provides customizable views of market liquidity. For example, a user may interact at 216 to access a plurality of customizable preset ladder views at each price point around ToB (here, 0.5 pip bands) or overtype a price for custom entry (here, 119.50). The interactive user interface also provides a customizable core account, at 218 where an user may enter 0, "ToB" for Top of Book mode. Other variations may be provided as well. When a user interacts at 220, the system may display a liquidity cover-ratio. For example, by rolling over at 220, the user may see how many times the core amount may be covered at that limit price. Accordingly, a higher ratio may represent a higher fill certainty. As shown at 222, the ratio is 4.1× in this example.

An embodiment of the present invention is directed to displaying market depth, which may include Wing display and Ladder display. According to an exemplary embodiment, Depth views illustrates a series of price points below and above the market. An embodiment of the present invention is directed to calculating the depth of liquidity that may be available down or up to that level. For example, each rung may be set as even or custom distances from market, which may include 0.5 pip, 1 pip, 2 pip, etc.

A user may customize preset ladder levels, e.g., narrow, standard wide, so as to easily switch between different views of the market. For example, narrow setting may demonstrate a depth shown at 0.5 pip intervals from market; standard setting may demonstrate a depth shown at 1 pip intervals from market; wide setting may demonstrate a depth shown at 2 pip intervals from market; and custom setting may demonstrate a depth shown at 1, 2, 3, 5, and 10 pips from market.

In addition, users may choose in FX cash settings whether to view Wing Display (e.g., to side of ticket), Ladder Display (e.g., beneath ticket), other custom views may be displayed.

Figure 3:
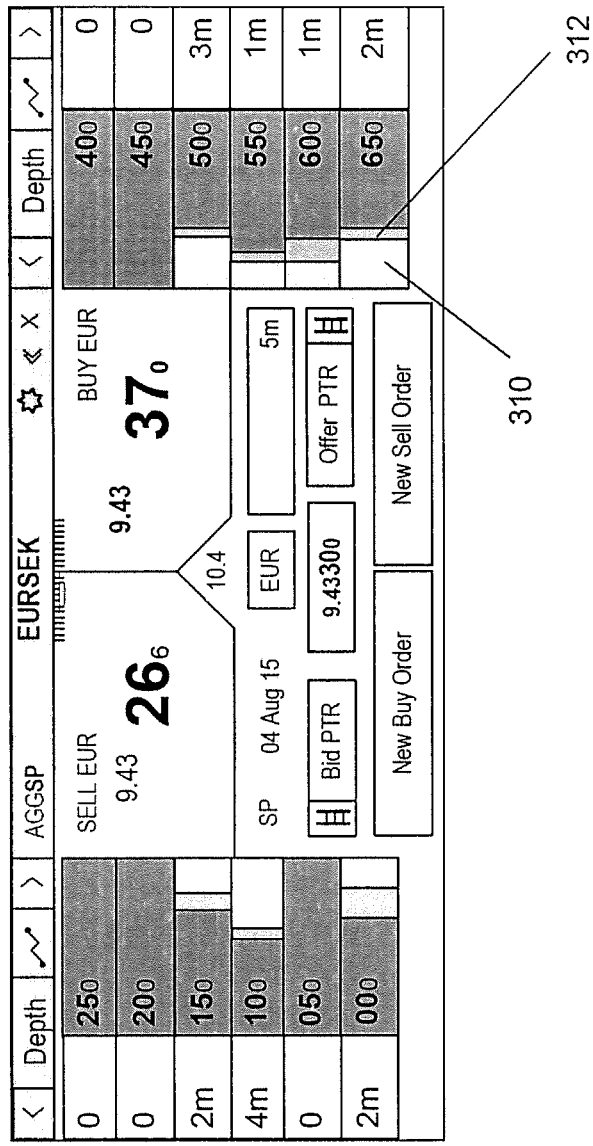
FIG. 3 is an exemplary diagram illustrating an exemplary depth ladder, according to an embodiment of the present invention.

FIG. 3 is an exemplary diagram illustrating an exemplary depth ladder, according to an embodiment of the present invention. The FX aggregator of an embodiment of the present invention is directed to providing pre-trade transparency and executing spot trades directly on aggregated prices from various networks, e.g., up to 14 or more different ECNs (Electronic Communication Networks). As shown in FIG. 3, a Franchise price and an Aggregator price are shown in an exemplary existing cash ticket. In this example, users may configure custom amounts, price bands, and slippage. FIG. 3 illustrates an interactive interface for launching algo orders including IOC on aggregator prices, for example.

Within the FX Aggregator, customers will have the option of viewing "Raw" and/or "Smart liquidity." As shown in FIG. 3, smart liquidity is illustrated at 310, which represents a pre-filtered Franchise view of available liquidity. FIG. 3 also illustrates at 312, Raw liquidity which represents a complete view of liquidity displayed in the market. In addition, net and cumulative depth views may be available.

"Smart Liquidity" view represents the liquidity that the Franchise believes, applying its experience assessing liquidity in FX markets, is accessible to the customer should they try to lift/hit the aggregate market. Generally, the Franchise will make no guarantee that a certain level of liquidity will remain available once the customer enters a request to trade. "Raw" view allows the customer to see the current market liquidity across external and internal liquidity streams visible to the Franchise.

According to an embodiment of the present invention, the FX Aggregator illustrates available market liquidity visible to the Franchise including selected external venues where the Franchise has access to liquidity plus Franchise internal liquidity streams. Certain external market liquidity may not be displayed in the aggregator in the event of connectivity issues or where the external venue fails to provide an indication of the relevant liquidity or where the relevant data or information is not available to the Franchise for any reason whatsoever. Certain liquidity may not be visible or available for aggregation on the Franchise markets for a number of reasons including the execution preferences of other trading clients.

Figure 4:
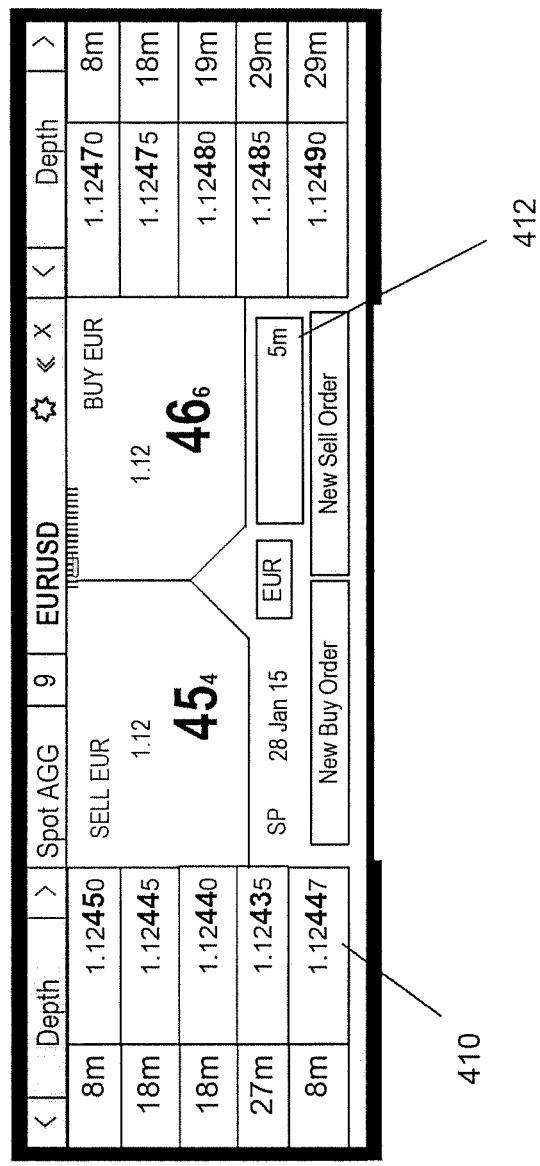
FIG. 4 is an exemplary illustration of an interactive user interface, according to an embodiment of the present invention.

According to another embodiment of the present invention, users may control market depth display where a user may click on a depth ladder wing/ladder rung and overtype rate to track liquidity at that level. For example, users may track liquidity at an exact price. In this example, the system may constantly calculate the amount of liquidity available down to 1.12447, as shown at 410, in FIG. 4. Thus, if a user has a position to cover at that rate, the user may view at a glance how much depth there is down to breakeven. For example, when a user clicks on the rung, at shown by 410, the system may submit a sell IoC order at that rate for the core amount (e.g., 5 mio EUR), as shown at 412. Also, an order ticket may be launched, automatically primed with an appropriate rate and amount.

Figure 5:
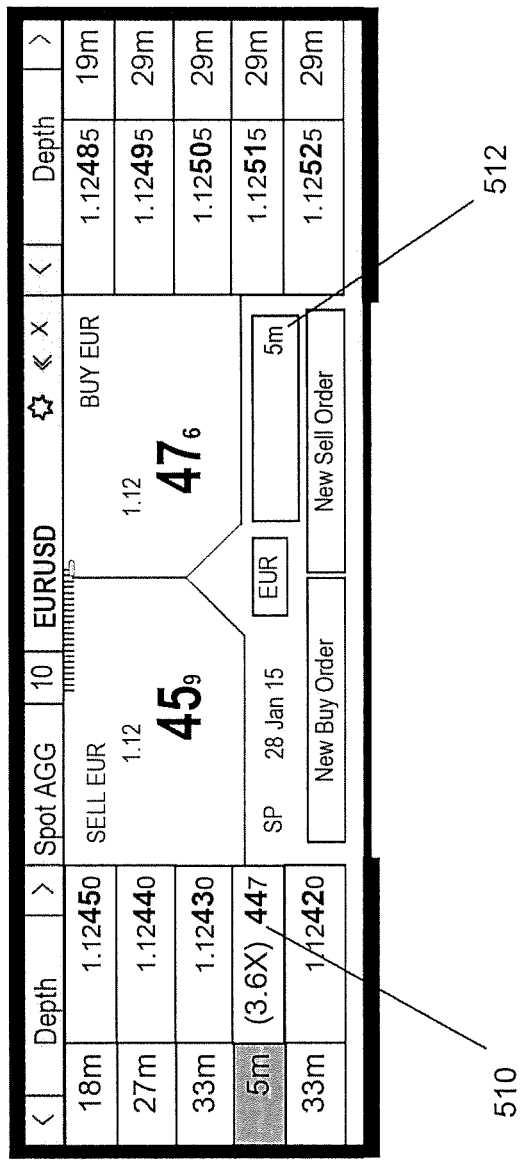
FIG. 5 is an exemplary illustration of an interactive user interface, according to an embodiment of the present invention.

FIG. 5 is an exemplary illustration of a screenshot, according to an embodiment of the present invention. Also, users may display a liquidity cover ratio where a user may interact with the interface to view how many times the desired amount is covered in the market, to that limit. For example, a user may rollover an amount cell at 510. In this example, an embodiment of the present invention illustrates that the 5 m desired amount, as shown at 512, is covered 3.6 times in the market, as shown by 510. Thus, in this example, the probability of fill is very high. This indicator may enable a user to establish how far down or up the ladder should place the limit, for the order in order to be sure of a fill. In this example, the order may immediately be placed at any displayed rung level.

Figure 6:
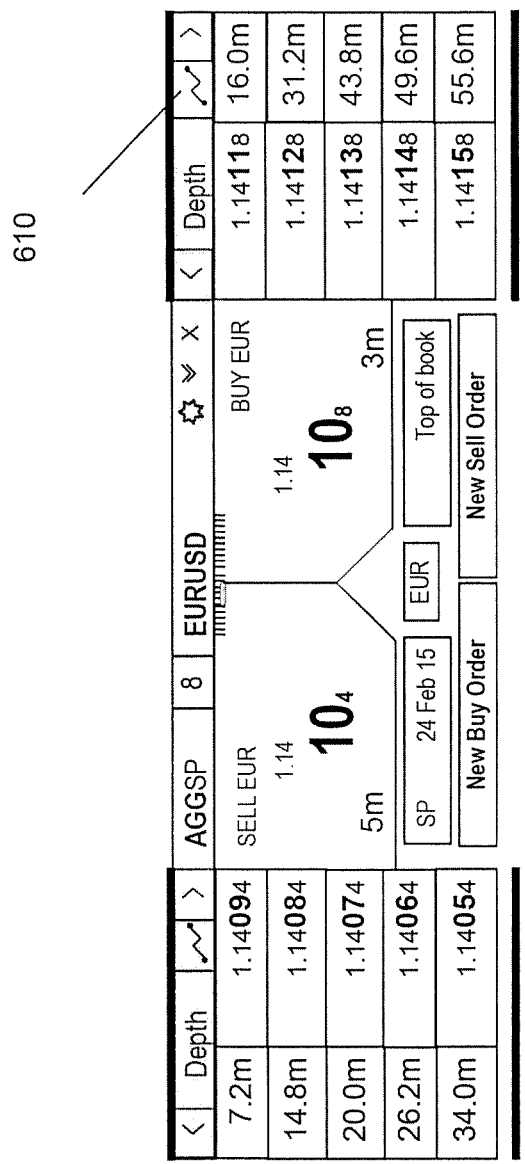
FIG. 6 is an exemplary illustration of an interactive user interface, according to an embodiment of the present invention.

FIG. 6 is an exemplary illustration of a screenshot, according to an embodiment of the present invention. For example, a user may toggle a graphical display on and off by clicking on the wing/ladder header graph symbol, as shown by 610. Rollover state and execution methodology may remain the same as in the numerical version for consistency. Entering custom price may switch the user back to numerical mode to enable precise tailoring. Also, the graphical mode may be re-enabled easily for subsequent monitoring.

Figure 7:
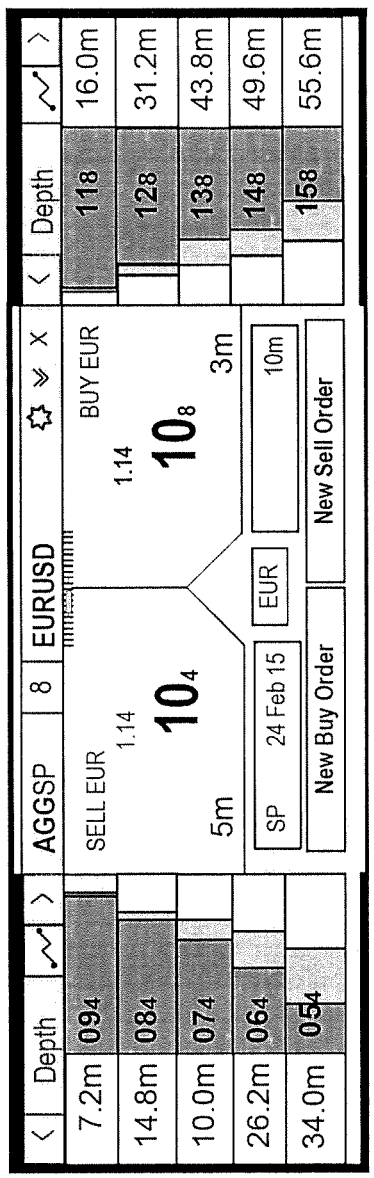
FIG. 7 is an exemplary Depth graph, according to an embodiment of the present invention.

FIG. 7 is an exemplary Depth graph, according to an embodiment of the present invention. Each rung may display smart and raw liquidity amounts so it is clear at a glance how much of the overall (raw) market the system considers to be executable currently. In this example, smart liquidity may represent the amount of liquidity that AlgoX team considers that is genuinely executable in the market at each price/amount point.

Figure 8:
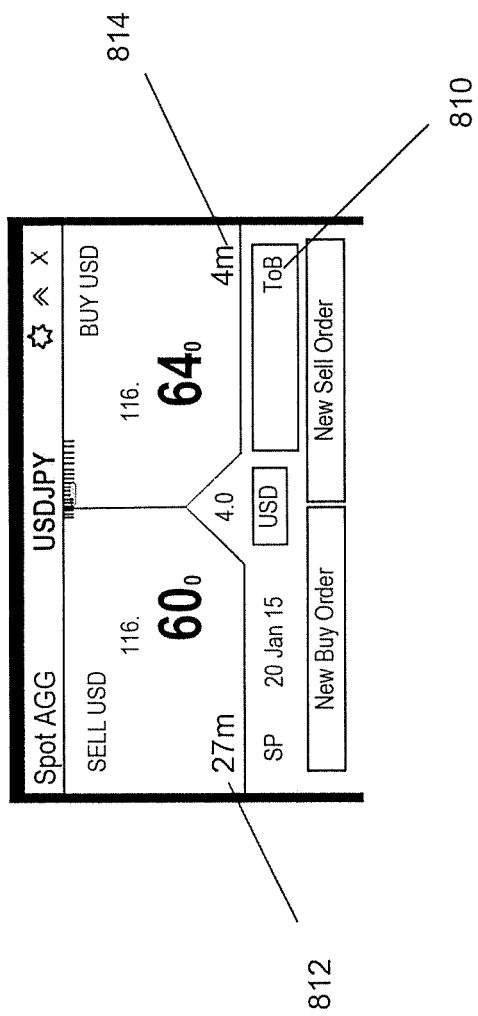
FIG. 8 is an exemplary illustration of VWAP prices, according to an embodiment of the present invention.

FIG. 8 is an exemplary illustration of VWAP prices, according to an embodiment of the present invention. An embodiment of the present invention is directed to generating and displaying VWAP price details. For example, the system may provide top of book price and liquidity. As shown in FIG. 8, a user may enter 0 or TOB/top in the amount field, at 810, to trigger a top of book mode. As shown, core price panel may display aggregated price at Top of Book and the liquidity on each side, as shown by 812 and 814. An order submission may launch an order ticket, with ToB liquidity prepopulated. In other words, an immediate order submission may be prevented as the core amount is not defined.

According to an embodiment of the present invention, the system may generate and display VWAP prices at a selected amount band. As shown in FIG. 8, a user may enter a custom amount, or select from Quick Notional Entry bar (which may appear on rollover). The amount entered may drive the price displayed. For example, entering 10 m may mean that the core price represents the VWAP price for the aggregated stream at 10 mio USD (or JPY). This amount may be used in order submission or order ticket launch. For example, if 5 m in view, then orders may be submitted/launched with 5 m prepopulated.

In addition, aggregated liquidity may be pre-filtered to display the liquidity sources that are executable at each amount. This feature is directed to providing a "what you see is what you get" view rather than a raw view of all liquidity sources.

An embodiment of the present invention is directed to generating and displaying VWAP prices for different amounts. This may be provided in a Wing view, Ladder view or view. For example, a user may overtype an amount at 810 to generate a custom VWAP which may be executed directly from the rung if so desired. Also, the user may predefine or customize amounts for each currency pair.

In an exemplary Amounts (VWAP) view, the system may generate and display a series of customizable amounts and further calculate and display the VWAP price that is achievable for each amount. The system may also predefine chosen amount bands for each currency pair or overtype an amount to show VWAP at that exact amount. The system may further customize preset ladder levels (e.g., narrow/standard/wide) so as to easily switch between different views of the market. A user may submit immediately by clicking on rung price (or launch order ticket) where an amount on that rung may be pre-populated and the limit may be automatically set to price on that rung.

An embodiment of the present invention is directed to generating and displaying graphical versions of VWAP prices. For example, the system may toggle graphical displays on and off by clicking on the wing/ladder header graph symbol. Rollover state and execution methodology remains same as in the numerical version for consistency. Graphical display over price area remains in place until toggled even as amount values are edited, so as to maintain view of "distance from ToB".

Figure 9:
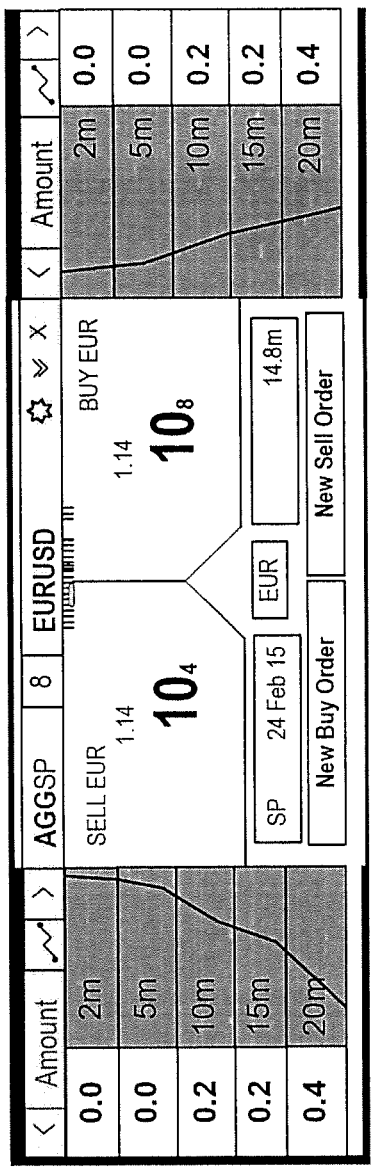
FIG. 9 is an exemplary illustration of an interactive user interface, according to an embodiment of the present invention.

FIG. 9 is an exemplary illustration of an interactive user interface, according to an embodiment of the present invention. For example, FIG. 9 graphically illustrates how far from the top of book price one needs to go to execute different amounts. The numbers displayed reflect this distance from market so to buy 20 m, one would need to go 0.4 pips away from the ToB price. Thus, the slope of this line is key—if near to vertical then the market is very liquid even for larger amounts; the further away from vertical the less liquid. This enables users to monitor changing liquidity conditions graphically across multiple ccy pairs at a glance without having to specifically examine constantly flickering rates and amounts. In addition, graph lines can be color-coded to reflect current liquidity conditions when measured against historical averages.

The system of an embodiment of the present invention further provides launch paid/given monitor functionality. For example, a Summary pane may provide high/low and last paid/given. The Summary pane may be shown or minimized independently of tick data to save space while maintaining a quick link to full detail. The system further provides detailed scrolling "Ticks" pane that shows market activity. The system may further provide every trade in chosen liquidity room, together with amount, timestamp, paid/given indication, and venue (where available and permissioned). Rolling fixed number of ticks initially, the system may be expanded on demand to retrieve a larger set for ease of analysis. The system further enables users to easily see and ratify their order activity against the wider market activity. In addition, the system may launch contextually from aggregated ticket or standalone from main ticket menus.

The system of an embodiment of the present invention further provides immediate order placement. For example, in Top of Book mode, immediate order submission may be prevented as no ticket amount is set. In this case, an order ticket may be launched with an amount set to ToB amount at time of click. With this setting activated, clicking various areas may submit an order immediately with no further user intervention/amendment needed.

With placement via order ticket activated, the system may launch an order ticket, with the rate and amount prepopulated. For example, the rate may be highlighted at launch to enable easy overtype and submit.

With prevent/control order placement through current market level in place, if the limit on order ticket is through the market by more than the defined amount, then the order submission may be completely prevented.

With control allowable slippage, the system may set default slippage allowed on execution by default. If this is set, then the basis points defined may be added to the submitted limit price, so that execution may still happen even if the price slips slightly beyond the submitted price. Thus, the user may have the ability to increase probability of execution, but at expense of absolute price level. The system may also select specific slippage for individual orders where probability of fill is less/more than an underlying default.

An embodiment of the present invention is directed to a FX aggregator ticket that shows a change in the spread to mid (on both the bid and the offer) and how the spread a user would pay gets wider as the amount the user wishes to trade gets larger. According to an embodiment of the present invention, the position of the spread to mid at any given point may then be referenced against a three-month daily average, plus two standard deviations, for the bottom rung on the amount ladder. Accordingly, this provides the user with a reference point to compare the spread the user would be paying for that amount.

Figure 10:
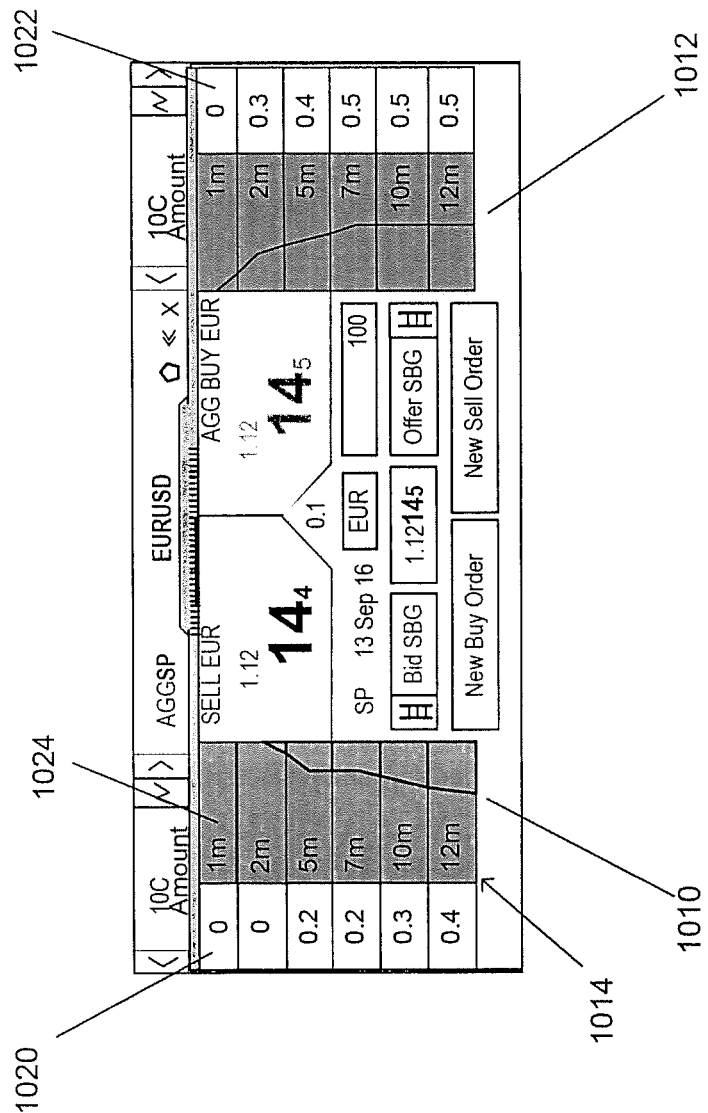
FIG. 10 is an exemplary diagram illustrating an exemplary amount ladder, according to an embodiment of the present invention.

An embodiment of the present invention provides a plurality of graphical pre-trade visualizations, including Depth Ladders as shown in FIG. 3, Amount Ladders as shown in FIG. 10, for example.

FIG. 10 is an exemplary diagram illustrating an exemplary amount ladder, according to an embodiment of the present invention. FIG. 10 illustrates pips distance from top of book price (either Franchise price or Aggregator price) for a given amount. Market liquidity indicators and inflection points may also be shown in the exemplary illustration.

In this exemplary illustration, depth swings are on the side, as shown by 1010 and 1012. The distance from the "Top of the Book" in depth on the side which is illustrated by 0.1, 0.2, 0.3, etc., as represented by 1020 and 1022 The line, as shown by 1010 and 1012, illustrates how the spread itself is widening as one progresses down to trade larger amounts. As the amount the user wants to trade is larger, the spread that the user has to pay on that amount increases. As shown in FIG. 10, the line itself does not actually hit the bottom of the window, as represented by 1014. In other words, the line itself in terms of where it is historically may be referenced to a 12 week moving average plus two standard deviations. If the line comes all the way out to 1014, this may indicate that the amount of spread that the user is paying for is fairly large relative to the last 12 weeks. So when there is a market event, for example, the spread may go very wide.

As shown in FIG. 10, the numbers 1, 2, 5, 7, 10, 12, as shown at 1024, represent different sizes above the amount. For example, for 5 m at $2 million, the user would pay 0.3 at the moment with 0.1 plus 2 additional spread to execute. Going down to $12 million, the user would pay an extra 0.6 on top of that price available in the market at the moment.

Figure 11:
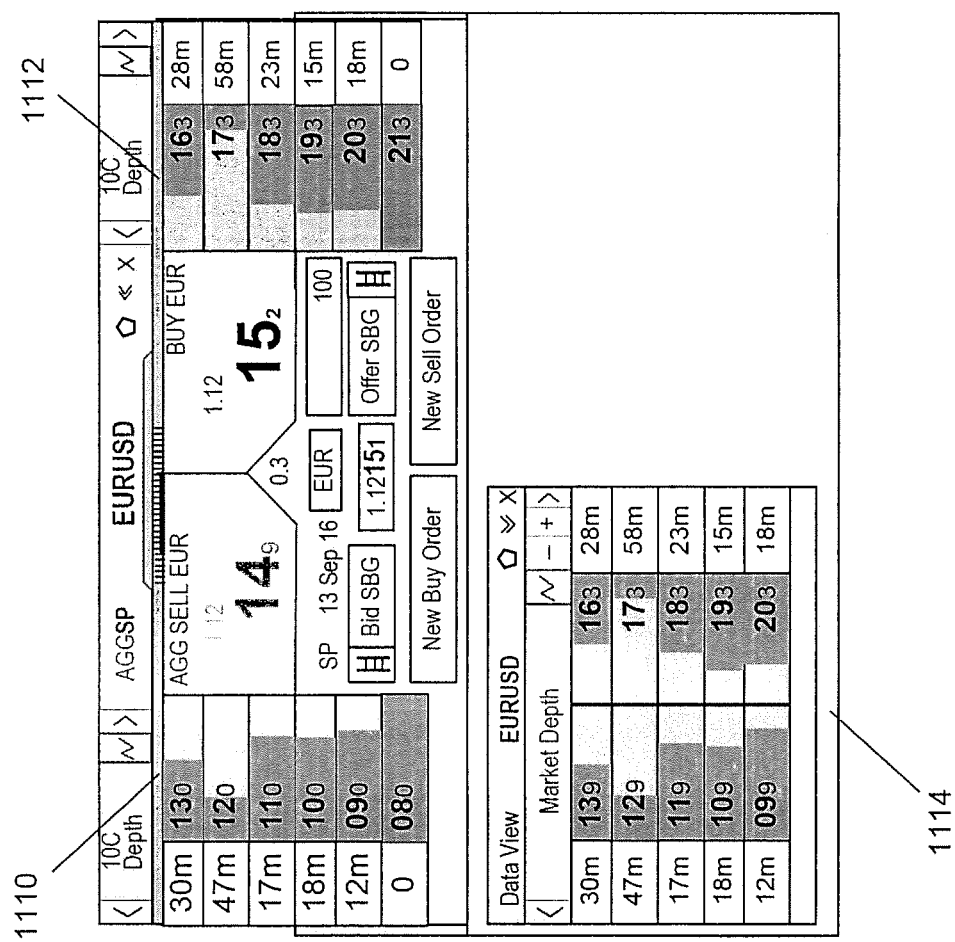
FIG. 11 is an exemplary market depth view, according to an embodiment of the present invention.

FIG. 11 is an exemplary market depth view, according to an embodiment of the present invention. FIG. 11 illustrates an aggregator ticket with a depth market view, according to an embodiment of the present invention. In this exemplary illustration, depth swings are on the side, as shown by 1110 and 1112, along with a corresponding depth market view below at 1114. As shown in this example of FIG. 11, market depth views are reasonably consistent across the space.

Accordingly, the system of an embodiment of the present invention provides a visualization of how the spread cost increases as the one goes down the liquidity ladder. Also, the system enables the user to ascertain where the cost in terms of spread is relative to a 12 week average plus two standard deviations.

An embodiment of the present invention is directed to providing a visual representation of a VWAP ladder, showing distance from market at defined volume intervals. The system further ensures that scaling of VWAP is appropriate so that the angle of the distance-from-market line plotted accurately represents the liquidity depth in market.

An embodiment of the present invention is directed to setting a scale at 2 standard deviations from the mean (over a defined period, e.g., 1 week, 1 month, etc.) at the largest volume point being shown. Accordingly, the system may accurately encompass 95%+ of datapoints (with other conditions remaining the same) and the scale of each chart may be intrinsically linked to the volatility of that ccypair and volume.

An embodiment of the present invention is directed to building up information (from kdb/exb, etc.) as to the distance from market for different volume amounts. The system may generate the mean and standard deviation for each designated volume point.

An embodiment of the present invention is directed to displaying and customizing a depth of market (e.g., liquidity by price band) view. The system may define price pillars and show actual and/or cumulative liquidity available at each price amount. For example, price pillars may be evenly spaced or customized. Price band pillars for Liquidity views may be: whole pips around market (e.g., if market 26.3/27.3 then 26, 25, 24 on Bid, 28, 29, 30 on Offer); fixed distances from market, interval definable (e.g., if market 26.3/27.3 then −1, −2, −3 on Bid, +1, +2, +3 on Offer); as-is, i.e., show next 'x' pillars (e.g., if market 26.3/27.3 then typically 26.2, 26.1, 25.9 etc. on Bid, 27.4, 27.5 etc. on Offer). Pillars may be subject to venue or ToB minimums (as per TP-4.1, TP-4.2). Also, amounts may be shown as actual or cumulative.

An embodiment of the present invention is directed to merging relative visualization and actual visualization. For example, amount views illustrate visualization of relative distance from top of book pricing at different amount bands. Depth views show actual visualization of amounts available at defined price bands.

Figure 12:
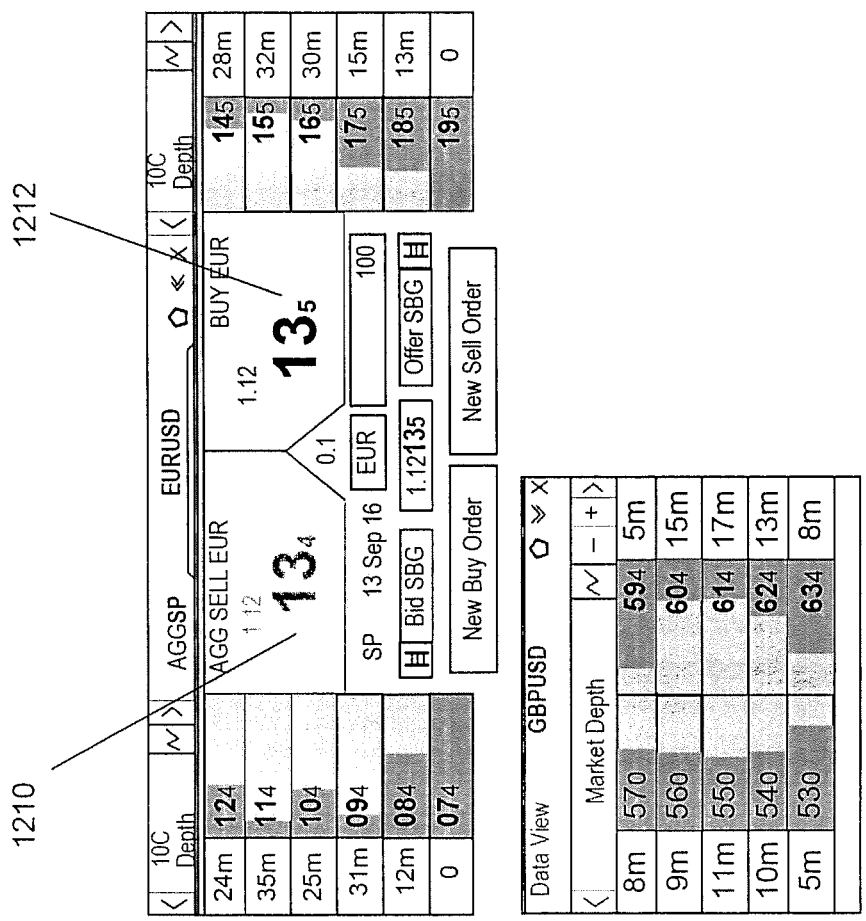
FIG. 12 is an exemplary market depth view, according to an embodiment of the present invention.

FIG. 12 is an exemplary market depth view, according to an embodiment of the present invention. The depth view shows at each of the prices, the best price in the market. This view illustrates how much liquidity is available at a particular level. For example, if a user is willing to execute at a price that's $55 million euros and liquidity in the market at that point. As shown, the value is slightly less as one moves down. FIG. 12 illustrates the cumulative and the net view so at different pairs, a user may view how much liquidity is available at an exact level. Switching to a cumulative view displays what a user may be willing to accept as a price that's far below the market. Accordingly, $133 million liquidity may be available at the price effectively in the market.

An embodiment of the present invention is directed to generating and commingling a franchise price and an aggregated price in a single interface. An embodiment of the present invention is directed to executing an algorithm that calculates available liquidity and determines liquidity amount changes whether the user is accessing smart liquidity, raw liquidity or other variations. For example, the system may be configured to provide price intermingling where the system may display a Franchise (or single bank) price in aggregator tickets when the Franchise price is better. The system may also consider fees in the displayed prices.

An embodiment of the present invention is directed to an visualization feature that illustrates to the end user the difference in internal (Franchise) liquidity and external liquidity. The system of an embodiment of the present invention identifies liquidity based on different liquidity sources. For example, the system may identify what one would be willing to pay for an amount of liquidity. The system may present a price that indicates the liquidity that one is executing is not the Franchise but is effectively an aggregate of what is available in the market so the system is passing the user directly to the market to get that liquidity. As a result, there are different execution risks associate with it. If one trades with the Franchise, even if the market loses, the Franchise will put forth servicing the client in any of the loss that might be incurred during the transaction. Accordingly, if one trades with the rust price (not Franchise price), the system is basically outsourcing that execution providing the external market and one will basically have to manage any of the execution risks on that particular trade.

FIG. 12 is an exemplary user interface that illustrates multiple representations of liquidity. As shown in FIG. 12, Price 1210 demonstrates a non-Franchise price while Price 1212 represents a Franchise price. The distinction between Franchise and non-Franchise price may be illustrated by a visual difference in the price as displayed to the user. This may be in the form of a color, size, and/or other graphical representation. According to an embodiment of the present invention, a Franchise price may represent an internal in-house (e.g., financial institution) electronic streaming price that is offered tailored to the client in question based on in-house tiering and positioning. Non-Franchise price may represent the unskewed mix of external ECN pricing sources and client-neutral feeds which are aggregated to provide one price stream.

An embodiment of the present invention is directed to a configurable stand-alone user interface grid that uses minimal screen footprint and provides market data views and trading views, decimal precision on benchmarks, reference price comparison, streaming price and Request for Quote (RFQ) execution, one or two click execution, quick filters and customizable views as well as pre and post trade allocation. For example, RFQ may represent a mechanism whereby the client specifically requests a price or price stream in order to execute as opposed to streaming executable price, which may always be available for execution without a specific client-driven request.

FIG. 13 is an exemplary screenshot that illustrates a benchmark comparison, according to an embodiment of the present invention. FIG. 13 illustrates an exemplary trading view where a user may select preset views at 1310, which may include on the run, bills, tips, strips, preset maturity ranges. The user may also identify bond types at 1312, which may include tradable, non-tradable, current and benchmark instruments. The system may provide quick filters and column sorting to refine the product view, as shown by 1314. The system may also provide auto resize, as shown by 1316, that may be toggled on or off for responsive or fixed grid height. In addition, the system may pin benchmarks, at 1318, to the top of a grid view. For example, upon interacting with a pin icon (or other interactive component), the user may view options to include or exclude. Other features may be provided.

An embodiment of the present invention is directed to enabling a user to select a reference price source to reference a Franchise price against. This may be applied to bonds, or a subset of bonds. For example, the system may determine that a franchise price for an amount is as good as or better than the reference price source for a given amount. Based on the determination, an interactive user interface may display an icon or other indication, as illustrated by 1320, that communicates to the user that the user may execute with confidence that this price is as good as, if not, better than a reference price source.

The indication may be a different color or representation of the price. Other variations, visuals and indicators may be implemented. The indication informs the user whether the price is from a particular source (e.g., Franchise, financial institution, etc.) or whether the price is derived from an aggregate VWAP calculation of different liquidities across different sources (e.g., a number of underlying platforms, etc.). The indication informs the user of the best possible price for a given amount regardless of whether or not the price comes from a Franchise or whether the price comes from an underlying pool of liquidity. Through this innovation, the user is able to make an informed decision as to whether to execute on a best price. Accordingly, different indications will inform the user that there are different characteristics involved that may affect a trade.

For example, by rooting an order across 15 or so underlying platforms, a client is not guaranteed a full 100% of that order due to complexities and underlying factors. In contrast, by trading directly with a single source, e.g., a Franchise, the associated complexities and risks are reduced. Accordingly, the ability to achieve a full or close to 100% of that order is much higher. There may be some instances where a client may choose to trade the lesser franchise price even if the aggregate price across a liquidity board is better due to execution risks that are generally hidden from the client.

An embodiment of the present invention is directed to a visualization technique that enables clients to reference the price provided by a Franchise against an underlying reference price. An embodiment of the present invention effectively removes the need to ask other dealers for a price because the system provides an indication that the user is getting an aggressive Franchise price. This innovative technique is particularly relevant and useful to the most liquid funds where there is an underlying broker market, in such situations where the bank themselves trade with each other. Accordingly, an embodiment of the present invention is directed to developing and executing an algorithm that aggregates volume weighted average price for different amounts of liquidity across various different underlying ECNs.

For example, by adding a total amount of liquidity available across different platforms, a resulting total may reach 100. However, an embodiment of the present invention recognizes that a total of 100 may not be actually achievable due to different characteristics and behaviors. By considering historical data, an embodiment of the present invention uses heuristics to determine that while 100 is showing traditionally, an actual result of 85 may be realized. An embodiment of the present invention may use the historical data so that when a client accesses what is available in the market, an embodiment of the present invention may adjust that to provide a more realistic calculation. The adjustment may be an increase or a decrease. For example, while a resulting total is 100, an actual achievable total is 85 based on historical calculations. With an embodiment of the present invention, a client may appreciate that a given result is based on historical and/or heuristics to provide a more realistic result.

According to another example, an embodiment of the present invention may take the aggregate prices cross a plurality of ECNs. The system may then create a volume weighted average price index, which represents how much liquidity is available in each of those values and then sum it up for the different amounts. Using what may be achieved and further based on heuristics, the system may determine a percentage the client may execute on and then use that as a reference price. Accordingly, when a client accesses a single dealer grid, an interactive icon may communicate or indicate to the client whether or not the price that is offered is as good as, if not better than, the underlying reference price source.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system that aggregates foreign exchange data and graphically represents a change in spread, wherein the system comprises:
  a storage mechanism that stores user profile data and foreign exchange market data;
  an aggregator server that receives market data from a plurality of sources and aggregates market prices;
  a computer processor, coupled to the storage mechanism and the aggregator server, and programmed to:
    aggregate data from a plurality of market data sources representing a plurality of different underlying markets; and
    generate an amount view, based on the aggregated data, that illustrates smart liquidity with respect to a moving average based on a predetermined time period plus two standard deviations; and
  an interactive user interface, coupled to the computer processor, that simultaneously displays graphically a plurality of aggregate prices for ease of comparison and user interaction, the plurality of aggregate prices comprising graphical representation of a raw market liquidity and a graphical representation of the smart liquidity, wherein the graphical representations are both interactive depth ladders with user customizable ladder intervals, and wherein the interactive user interface also includes user customizations for custom amounts, price bands, and slippage, the interactive user interface further displaying a first slope representing a change in spread between a bid and an offer, overlaid on the graphical representation of a raw market liquidity and a second slope representing a change in spread between a bid and an offer, overlaid on the graphical representation of smart liquidity, the first and second slopes are positively correlated with market liquidity and is color coded to reflect current liquidity condition against historical liquidity averages, and wherein the interactive user interface provides quick filters and column sorting to refine the view as well as auto-resize for a fixed grid height as well as a summary pane that provides historical transaction data, and further wherein the interactive user interface displays, upon a specific user action, a liquidity cover-ratio illustrating how many times a core amount may be covered at a given limit price along with net and cumulative depth views;
  wherein the interactive amount view is generated in real-time; and
  wherein the interactive user interface is configured to assist a user to visualize and compare market liquidity data by displaying a buy price and a sell price based on a selection of the user customizable ladder intervals, and further wherein the interactive user display submits a transaction request based on the buy and sell price resulting from the selection of the user customizable ladder intervals.

2. The system of claim 1, wherein the moving average is calculated for a 12 week average.

3. The system of claim 1, wherein the interactive user interface illustrates smart liquidity and raw liquidity.

4. The system of claim 1, wherein the plurality of underlying markets represent a plurality of Electronic Communication Networks.

5. The system of claim 1, wherein the aggregated market prices comprise Top of the Book data.

6. The system of claim 1, wherein the aggregated market prices comprise Volume Weighted Average Prices.

7. The system of claim 1, wherein the moving average is calculated for a three month daily average.

8. The system of claim 1, wherein the interactive user interface indicates a cost in terms of spread relative to the moving average plus two standard deviation.

9. The system of claim 1, wherein the interactive user interface provides a reference point to compare the spread paid for an amount.

10. An automated computer implemented method that aggregates foreign exchange data and graphically represents a change in spread, wherein the method comprising the steps of:
  aggregating, via an aggregator server, data from a plurality of market data sources representing a plurality of different underlying markets;
  generating, via a programmed computer processor, an amount view, based on the aggregated data, that illustrates smart liquidity with respect to a moving average based on a predetermined time period plus two standard deviations;

providing, via an interactive user interface, simultaneous graphical display of a plurality of aggregate prices for ease of comparison and user interaction, the plurality of aggregate prices comprising graphical representation of a raw market liquidity and a graphical representation of the smart liquidity, wherein the graphical representations are both interactive depth ladders with user customizable ladder intervals, and wherein the interactive user interface also includes user customizations for custom amounts, price bands, and slippage, the interactive user interface further displaying a first slope representing a change in spread between a bid and an offer, overlaid on the graphical representation of a raw market liquidity and a second slope representing a change in spread between a bid and an offer, overlaid on the graphical representation of smart liquidity the first and second slopes are positively correlated with market liquidity and is color coded to reflect current liquidity condition against historical liquidity averages, and wherein the interactive user interface provides quick filters and column sorting to refine the view as well as auto-resize for a fixed grid height as well as a summary pane that provides historical transaction data, and further wherein the interactive user interface displays, upon a specific user action, a liquidity cover-ratio illustrating how many times a core amount may be covered at a given limit price along with net and cumulative depth views;

wherein the interactive amount view is generated in real-time; and wherein the interactive user interface is configured to assist a user to visualize and compare market liquidity data by displaying a buy price and a sell price based on a selection of the user customizable ladder intervals, and further wherein the interactive user display submits a transaction request based on the buy and sell price resulting from the selection of the user customizable ladder intervals.

11. The method of claim 10, wherein the moving average is calculated for a 12 week average.

12. The method of claim 10, wherein the interactive user interface illustrates smart liquidity and raw liquidity.

13. The method of claim 10, wherein the plurality of underlying markets represent a plurality of Electronic Communication Networks.

14. The method of claim 10, wherein the aggregated market prices comprise Top of the Book data.

15. The method of claim 10, wherein the aggregated market prices comprise Volume Weighted Average Prices.

16. The method of claim 10, wherein the moving average is calculated for a three month daily average.

17. The method of claim 10, wherein the interactive user interface indicates a cost in terms of spread relative to the moving average plus two standard deviation.

18. The method of claim 10, wherein the interactive user interface provides a reference point to compare the spread paid for an amount.

* * * * *